(12) United States Patent
Han et al.

(10) Patent No.: US 9,464,597 B2
(45) Date of Patent: Oct. 11, 2016

(54) ENGINE SYSTEM (71) Applicant: Hyundai Motor Company, Seoul (KR)

(72) Inventors: Dong Hee Han, Seoul (KR); Seung Kook Han, Suwon-si (KR); Hyeon Ho Kim, Yongin-si (KR); Il Joong Hwang, Gunpo-si (KR); Dong Ho Chu, Ansan-si (KR); Jong Il Park, Seoul (KR); Yoon Joo Kim, Yongin-si (KR); Hyuk Im, Suwon-si (KR); Hyun Jun Lim, Incheon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/137,874

(22) Filed: Dec. 20, 2013

(65) Prior Publication Data

US 2015/0068204 A1    Mar. 12, 2015

(30) Foreign Application Priority Data

Sep. 6, 2013 (KR) ........................ 10-2013-0107415

(51) Int. Cl.
| | |
|---|---|
| *F01N 3/02* | (2006.01) |
| *F01N 3/10* | (2006.01) |
| *F02D 41/00* | (2006.01) |
| *F02M 25/10* | (2006.01) |
| *F02M 25/07* | (2006.01) |
| *F02B 37/12* | (2006.01) |
| *F02B 33/44* | (2006.01) |
| *F02B 37/16* | (2006.01) |
| *F02B 37/18* | (2006.01) |

(52) U.S. Cl.
CPC ........ *F02M 25/0715* (2013.01); *F02B 33/446* (2013.01); *F02B 37/127* (2013.01); *F02B 37/16* (2013.01); *F02B 37/18* (2013.01); *F02M 26/04* (2016.02); *F02M 26/13* (2016.02); *Y02T 10/121* (2013.01); *Y02T 10/144* (2013.01)

(58) Field of Classification Search
USPC ......................... 60/599, 601–603, 605.2, 611
See application file for complete search history.

(56) References Cited

U.S. PATENT DOCUMENTS

| | | | |
|---|---|---|---|
| 2011/0131975 A1* | 6/2011 | Styles | 60/602 |
| 2011/0132335 A1* | 6/2011 | Pursifull et al. | 123/564 |
| 2011/0252785 A1* | 10/2011 | Pursifull et al. | 60/600 |

FOREIGN PATENT DOCUMENTS

| | | |
|---|---|---|
| JP | 2012-7545 A | 1/2012 |
| JP | 2012-57582 A | 3/2012 |
| KR | 10-1071873 B1 | 2/2011 |
| KR | 10-2012-0126209 A | 11/2012 |

* cited by examiner

*Primary Examiner* — Jesse Bogue
*Assistant Examiner* — Dapinder Singh
(74) *Attorney, Agent, or Firm* — Morgan, Lewis & Bockius LLP (57) ABSTRACT

An engine system may include a main intake line, a supplementary intake line branched from the main intake line and joined to the main intake line, an intake bypass valve mounted to the main intake line, a main exhaust line mounted to an exhaust manifold, a supplementary exhaust line branched from the exhaust manifold and joined to the main exhaust line, an exhaust bypass valve mounted to the main exhaust line and selectively opening the main exhaust line, a turbocharger disposed adjacent to the supplementary exhaust line and operated by exhaust gas passing through the supplementary exhaust line, and a control unit for controlling the intake bypass valve and the exhaust bypass valve depending on an operation condition, wherein the exhaust gas is re-circulated from an upstream side of the exhaust bypass valve to the main intake line passing through an EGR (Exhaust Gas Recirculation) cooler and an EGR valve.

9 Claims, 6 Drawing Sheets

LOW SPEED PARTIAL LOAD

FIG.5

HIGH SPEED PARTIAL LOAD

FIG.6

ENGINE SYSTEM

CROSS-REFERENCE TO RELATED APPLICATION

The present application claims priority to Korean Patent Application No. 10-2013-0107415 filed on Sep. 6, 2013, the entire contents of which is incorporated herein for all purposes by this reference.

BACKGROUND OF THE INVENTION

1. Field of the Invention

The present invention relates to an engine system in which exhaust gas is re-circulated by using a turbocharger for improving an output in a low speed range, increasing combustion efficiency, and improving an exhaust gas quality.

2. Description of Related Art

In general, it is known that a diesel engine may have fuel consumption lower than a gasoline engine and efficiency better than the gasoline engine. In general, the diesel engine displays efficiency in a range of 40% owing to a high compression ratio of the diesel engine.

Currently, in order to obtain a high output from the engine, the engine is provided with the turbo charger and an inter cooler, additionally.

The engine having the turbo charger applied thereto thus intakes the exhaust gas or external air with a compressor in the turbo charger and supplies supercharged air (High temperature compressed air) produced thereby to an engine side.

However, the air compressed rapidly absorbs heat from the turbo charger and heat generated in a course of the compression so as to be involved in drop of density, resulting in poor charging efficiency. Therefore, the supercharged air is cooled by using the intercooler to obtain high density, resulting to intake much air into an engine combustion chamber, enabling to obtain a high output.

In the meantime, currently, meeting the exhaust gas control trend, such as EURO 3 or EURO 4 of the Europe, a variety of systems are suggested, in which a portion of the exhaust gas containing CO, HC, NOx, and so on being exhausted from a turbo diesel engine is re-circulated for reducing contents thereof further. Of the systems, typical one is an EGR System (Exhaust Gas Recirculation System).

Along with this, a research is underway, in which an output torque is increased while reducing the fuel consumption in medium to low speed ranges of engine RPM in the engine having the turbo charger, and a research is also underway for making efficient control of the supply of the re-circulated gas.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an engine system having advantages of an improved engine output in a low speed range, increased combustion efficiency, and an improved exhaust gas quality. According to an exemplary embodiment of the present invention, an object of the present invention is to provide an engine system which reduces fuel consumption, increases an output torque, and controlling supply of re-circulating exhaust gas more efficiently in medium and low speed ranges of the engine.

An engine system may include a main intake line configured for supplying external air to an intake manifold attached to a cylinder block, a supplementary intake line branched from a first side of the main intake line and joined to a second side of the main intake line, an intake bypass valve mounted to the main intake line, a main exhaust line mounted to an exhaust manifold attached to the cylinder block for flow of an exhaust gas from the exhaust manifold, a supplementary exhaust line branched from the exhaust manifold and joined to the main exhaust line, an exhaust bypass valve mounted to the main exhaust line and selectively opening the main exhaust line, a turbocharger disposed adjacent to the supplementary exhaust line and operated by an exhaust gas passing through the supplementary exhaust line for pumping an intake flowing through the supplementary intake line, and a control unit for controlling the intake bypass valve and the exhaust bypass valve depending on an operation condition, wherein the exhaust gas is re-circulated from an upstream side of the exhaust bypass valve to the main intake line passing through an EGR (Exhaust Gas Recirculation) cooler and an EGR valve.

The engine system may further include an intercooler mounted to the supplementary intake line on a downstream side of the turbocharger and fluid-connected to the main intake line, and an EGR line branched from the exhaust manifold at an downstream of the exhaust bypass valve and connected to the main intake line upstream of the intake bypass valve for re-circulating the exhaust gas.

The engine system may further include a throttle body mounted to an inlet of the intake manifold for controlling an intake flow rate being supplied to the engine.

The control unit may open the intake bypass valve and the exhaust bypass valve when a load is lower than a set value in a preset low speed range, and control opening of the exhaust bypass valve and the EGR valve for controlling re-circulating exhaust gas being supplied to the main intake line through the EGR line.

The control unit may close the intake bypass valve and opens the exhaust bypass valve when the load is higher than a set value in a preset low speed range, and control opening of the exhaust bypass valve and the EGR valve for controlling the re-circulating exhaust gas being supplied to the main intake line through the EGR line.

The intake bypass valve is mounted on a downstream side of, and adjacent to, a point where the EGR line and the main intake line join together.

The intake bypass valve is mounted on an upstream side of a point where the intercooler and the main intake line join together.

The EGR valve is mounted to a point where the EGR line and the main intake line join together.

The turbocharger may have an air flow coefficient of below 2 with reference to an air flow rate passing through a compressor, wherein the air flow coefficient is defined as the air flow coefficient=a highest air flow rate (kg/h) passing through the compressor/an exhaust rate (L)/100.

To achieve the object of the present invention, in the low speed low load (A partial load), the intake bypass valve and the exhaust bypass are opened, and the flow rate of the re-circulated exhaust gas may be controlled precisely with opening of the EGR valve and the exhaust bypass valve.

And, in the low speed high load (Full load), the intake bypass valve is closed, and the flow rate of the re-circulated exhaust gas may be controlled precisely by controlling opening of the exhaust bypass valve and the EGR valve.

And, by mounting the intake bypass valve adjacent to a point where the EGR line and the intake line join together, the re-circulation exhaust gas may be controlled more precisely.

Along with this, the EGR line branched from an upstream side of the intake bypass valve and connected to an upstream side of the intake bypass valve of the main intake line permits to control the re-circulating exhaust gas with one EGR valve.

The methods and apparatuses of the present invention may have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be may include d within the spirit and scope of the invention as defined by the appended claims.

An exemplary embodiment of the present invention will hereinafter be described in detail with reference to the accompanying drawings.

Figure 1:
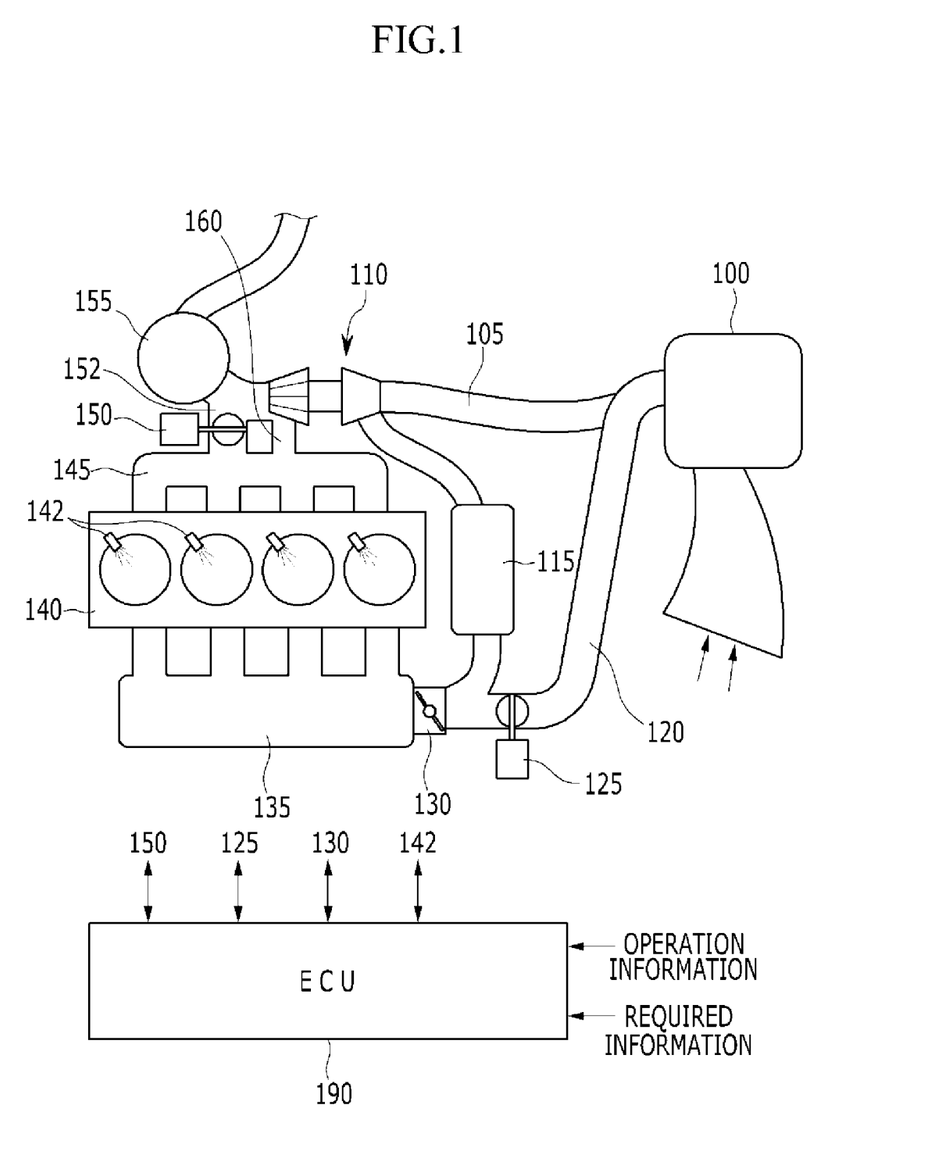
FIG. 1 illustrates a schematic diagram of an engine system in accordance with an exemplary embodiment of the present invention.

FIG. 1 illustrates a schematic diagram of an engine system in accordance with an exemplary embodiment of the present invention.

Referring to FIG. 1, the engine system may include an air cleaner box 100, supplementary intake line 105, a main intake line 120, an intercooler 115, an intake bypass valve 125, a throttle body 130, an intake manifold 135, a cylinder block 140, injectors 142, an exhaust manifold 145, a supplementary exhaust line 160, a main exhaust line 152, an exhaust bypass valve 150, a small sized turbocharger 110, a catalyst 155, and a control unit 190.

The control unit 190 determines a required torque upon reception of operation conditions, such as an engine speed and required operation signals, such as accelerator pedal signal, and controls controllable constituent elements and a fuel spray amount of the injector 142.

Along with this, the control unit 190 controls the intake bypass valve 125 and the exhaust bypass valve 150, to control a re-circulation rate of the exhaust gas. Since the engine control with the control unit 190 is known, detailed description will be omitted.

The turbocharger 110 may include a turbine mounted to the supplementary exhaust line 160, and a pump mounted to the supplementary intake line 105, wherein the turbine mounted to the supplementary exhaust line 160 is rotated by an exhaust gas flow to rotate the pump for pumping intake.

The main exhaust line 152 is branched from the exhaust manifold 145, may have the exhaust bypass valve 150 mounted thereto, the supplementary exhaust line 160 is branched from the exhaust manifold 145 and joins with the main exhaust line 152, and the catalyst 155 is mounted to a downstream side of a point where the supplementary exhaust line 160 and the main exhaust line 152 join together.

In an exemplary embodiment of the present invention, when the exhaust bypass valve 150 closes, the exhaust gas passes the turbine of the turbocharger 110 through the supplementary exhaust line 160.

And, when the exhaust bypass valve 150 is opened fully, since most of the exhaust gas exhausts through the main exhaust line 152, the turbocharger 110 does not operate, almost.

The supplementary intake line 105 may have the air cleaner box 100, the pump of the turbocharger, the intercooler 115, and the throttle body 130 mounted thereto.

The supplementary intake line 105 is branched from the main intake line 120 on a downstream side of the air cleaner box 100, bypasses the turbocharger 110 and the intercooler 115, and joins to the main intake line 120 on a downstream side of the intercooler 115. The main intake line 120 may have the intake bypass valve 125 mounted thereto.

In an exemplary embodiment of the present invention, the turbocharger 110 is small sized, of which air flow coefficient is below 2 with reference to an air flow rate passing through the compressor (Pump) mounted to an intake side. And, the air flow coefficient may be defined as the air flow coefficient=a highest air flow rate (kg/h) passing through the compressor/an exhaust rate (L)/100.

Figure 2:
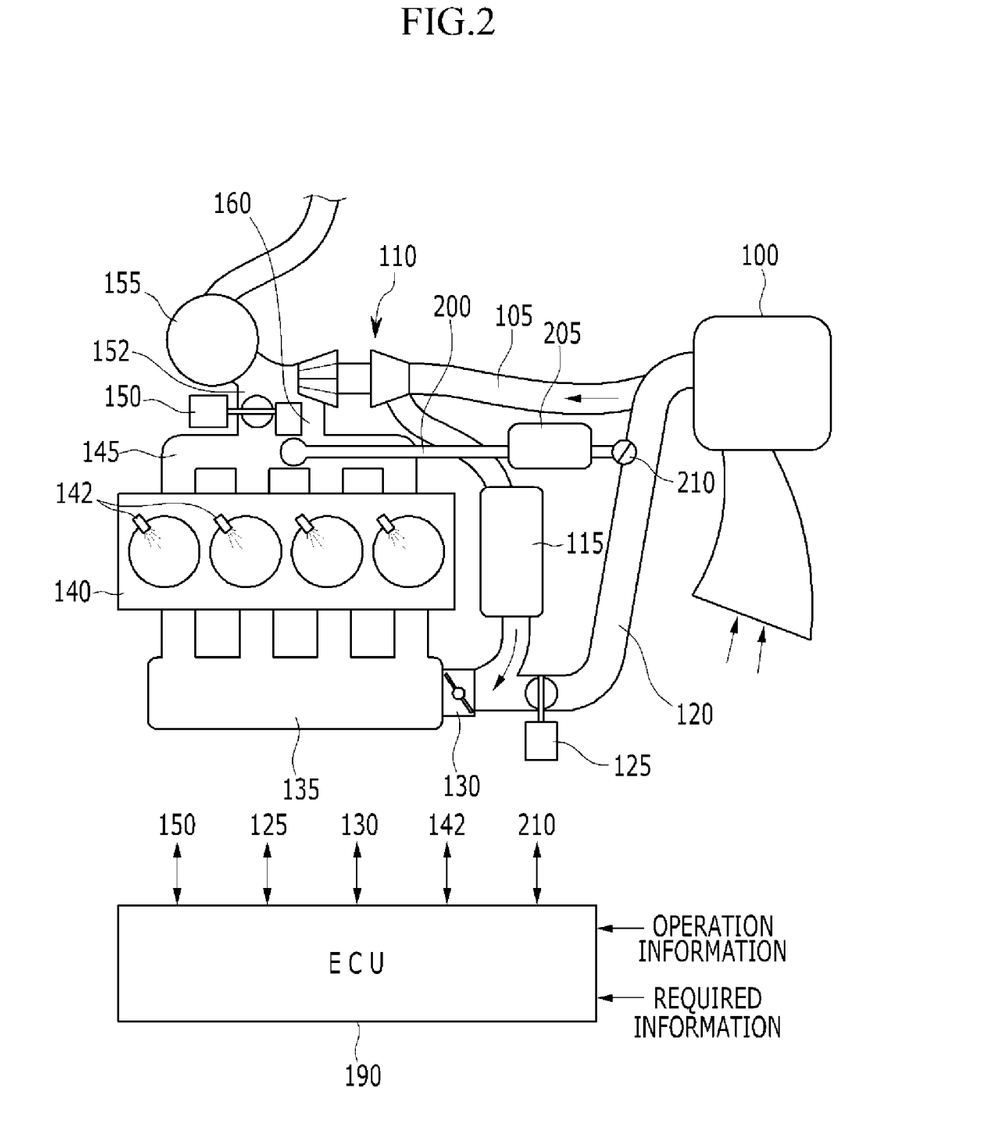
FIG. 2 illustrates a schematic diagram of an engine system in accordance with an exemplary embodiment of the present invention.

FIG. 2 illustrates a schematic diagram of an engine system in accordance with an exemplary embodiment of the present invention. FIG. 2 will be described mainly in comparison to FIG. 1.

Referring to FIG. 2, an EGR line 200 is branched from the exhaust manifold 145 and joins the main intake line 120. And, the EGR line 200 may have an EGR cooler 205 disposed thereon, and there is an EGR valve 210 disposed to a joining point of the EGR line 200 and the main intake line 120.

Therefore, the exhaust gas supplied from the exhaust manifold 145 to the EGR line 200 is supplied to the main intake line 120 through the EGR cooler 205, and the EGR valve 210. A flow rate of re-circulating exhaust gas may be controlled with the EGR valve 210 and the exhaust gas bypass valve 150.

Figure 3:
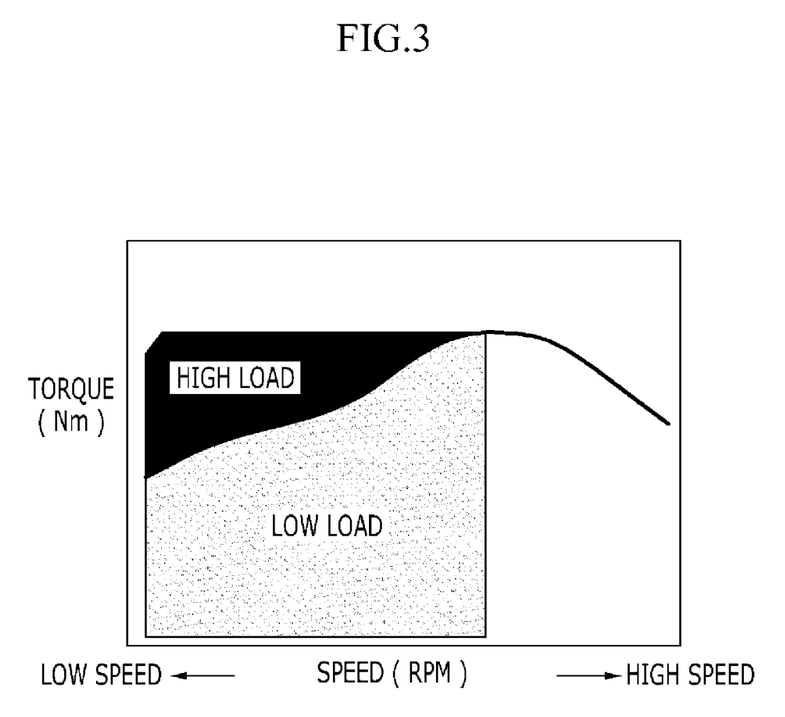
FIG. 3 illustrates a graph showing an engine speed vs. a load of an engine system in accordance with an exemplary embodiment of the present invention.
Figure 4:
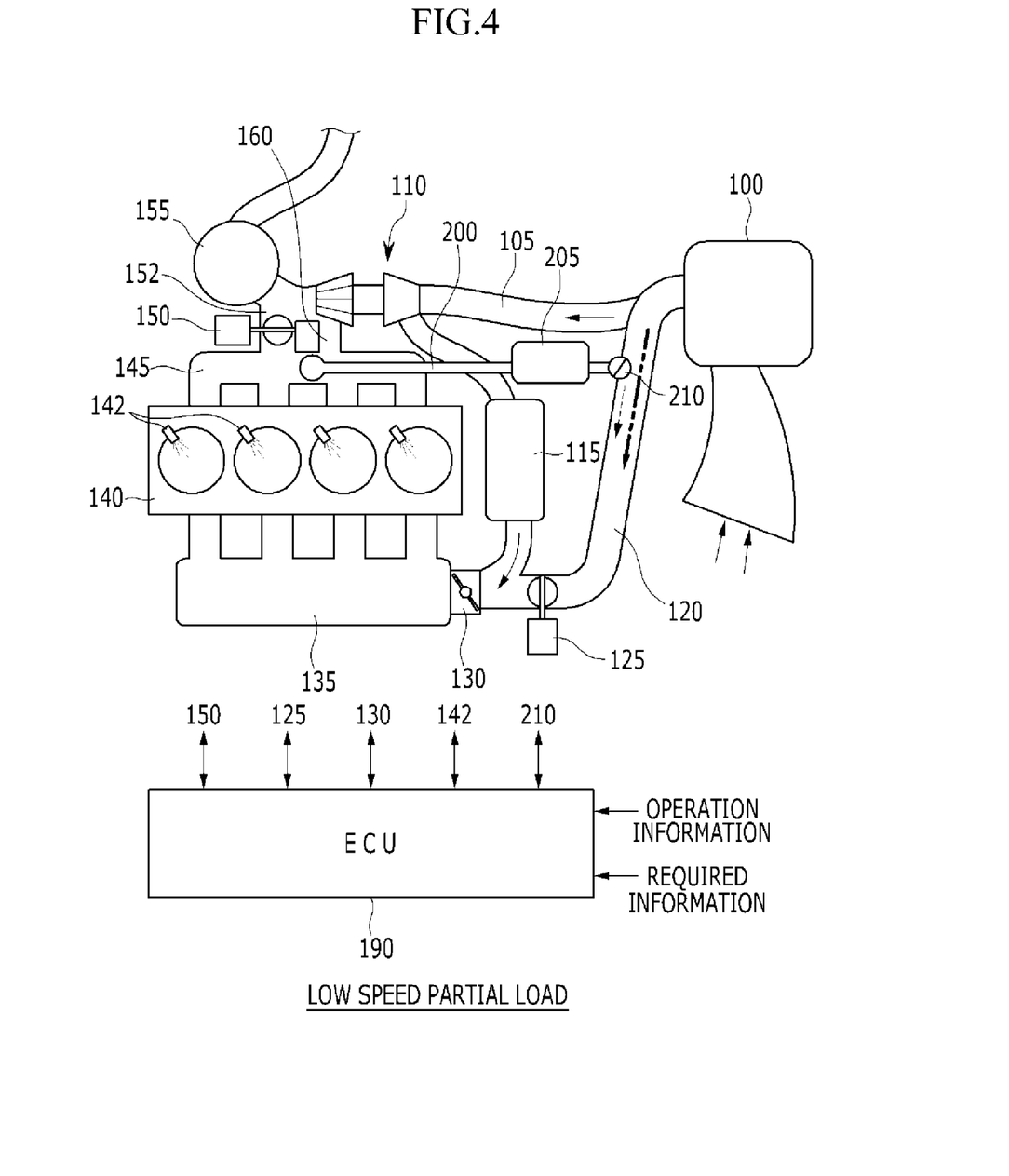
FIG. 4 illustrates a schematic diagram showing a low speed and low load state of an engine system in accordance with an exemplary embodiment of the present invention.
Figure 5:
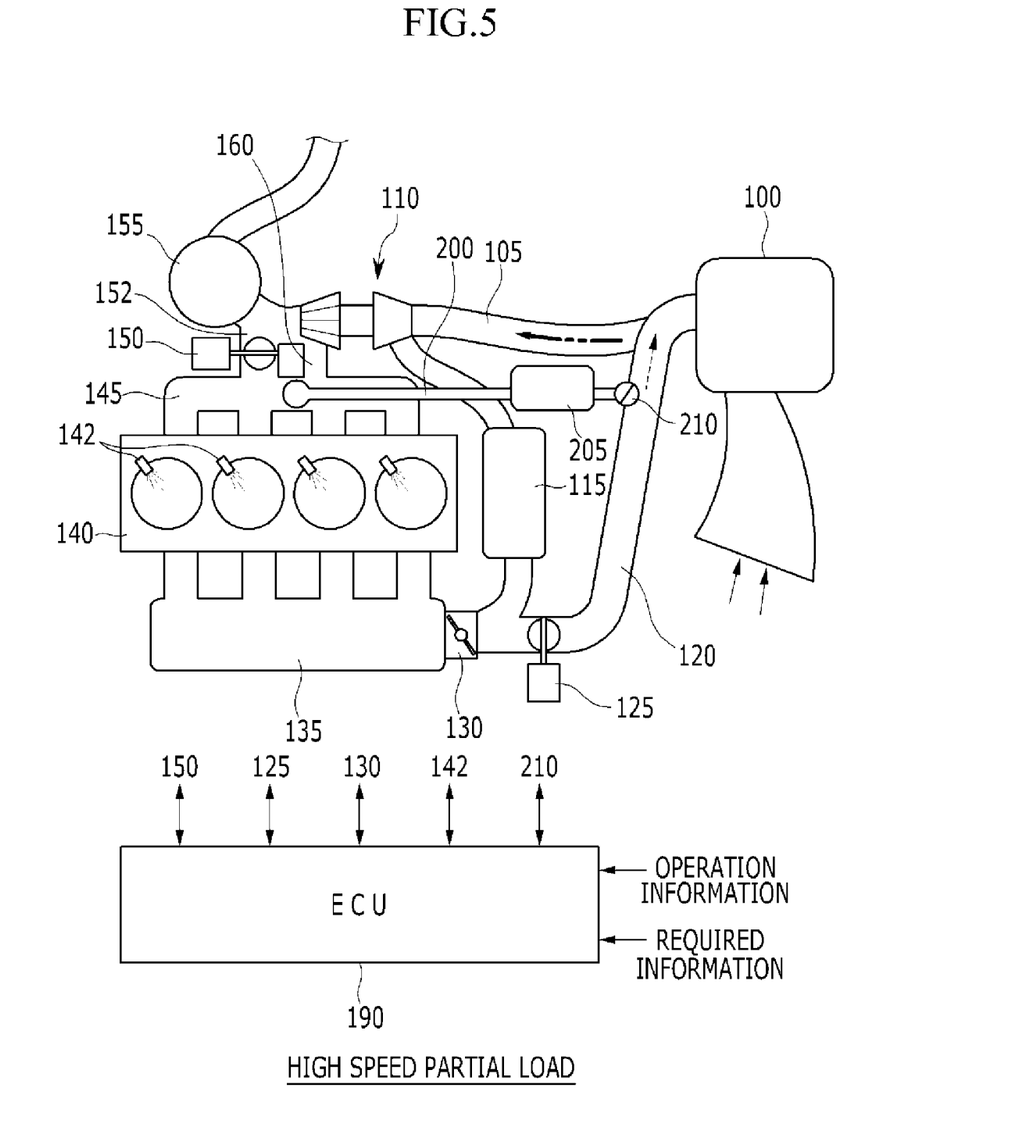
FIG. 5 illustrates a schematic diagram showing a low speed and high load state of an engine system in accordance with an exemplary embodiment of the present invention.

FIG. 3 illustrates a graph showing an engine speed vs. a load of an engine system in accordance with an exemplary embodiment of the present invention, FIG. 4 illustrates a schematic diagram showing a low speed and low load state of an engine system in accordance with an exemplary embodiment of the present invention, and FIG. 5 illustrates a schematic diagram showing a low speed and high load state of an engine system in accordance with an exemplary embodiment of the present invention.

Referring to FIG. 3, a horizontal axis denotes an engine RPM and a vertical axis denotes an engine output torque (Nm). In this case, a low speed region is divided to a low load (Partial load) region and a high load (Full load) region. The low speed region is preset to may have a rotation speed of the engine lower than a set value, and the low load region and the high load region are divided with reference to the output torque.

Referring to FIG. 4, in the low load region of the low speed region, the intake bypass valve 125 and the exhaust bypass valve 150 are opened, such that the exhaust gas does not operate the turbocharger 110, but passes through the main exhaust line 152. Therefore, the intake is supplied to the intake manifold 135 through the main intake line 120, the intake bypass valve 125 and the throttle body 130.

And, in order to control a flow rate of the exhaust gas being re-circulated to the main intake line 120 through the EGR line 200, opening of the exhaust bypass valve 150 and the EGR valve 210 may be controlled, respectively.

Referring to FIG. 5, in the high load region of the low speed region, the intake bypass valve 125 is closed such that the entire intake passes the turbocharger 110. And, by controlling opening of the exhaust bypass valve 150, operation and an output of the turbocharger 110 are controlled.

Along with this, the flow rate of the re-circulating exhaust gas being supplied to the main intake line 120 through the EGR line 200 is controlled precisely by controlling the opening of the exhaust bypass valve 150 and the EGR valve 210.

Since the intake bypass valve 125 is closed in a state shown in FIG. 5, the EGR gas being supplied to the EGR valve 210 flows the main intake line 120 in a reverse direction and is supplied to the supplementary intake line 105.

Figure 6:
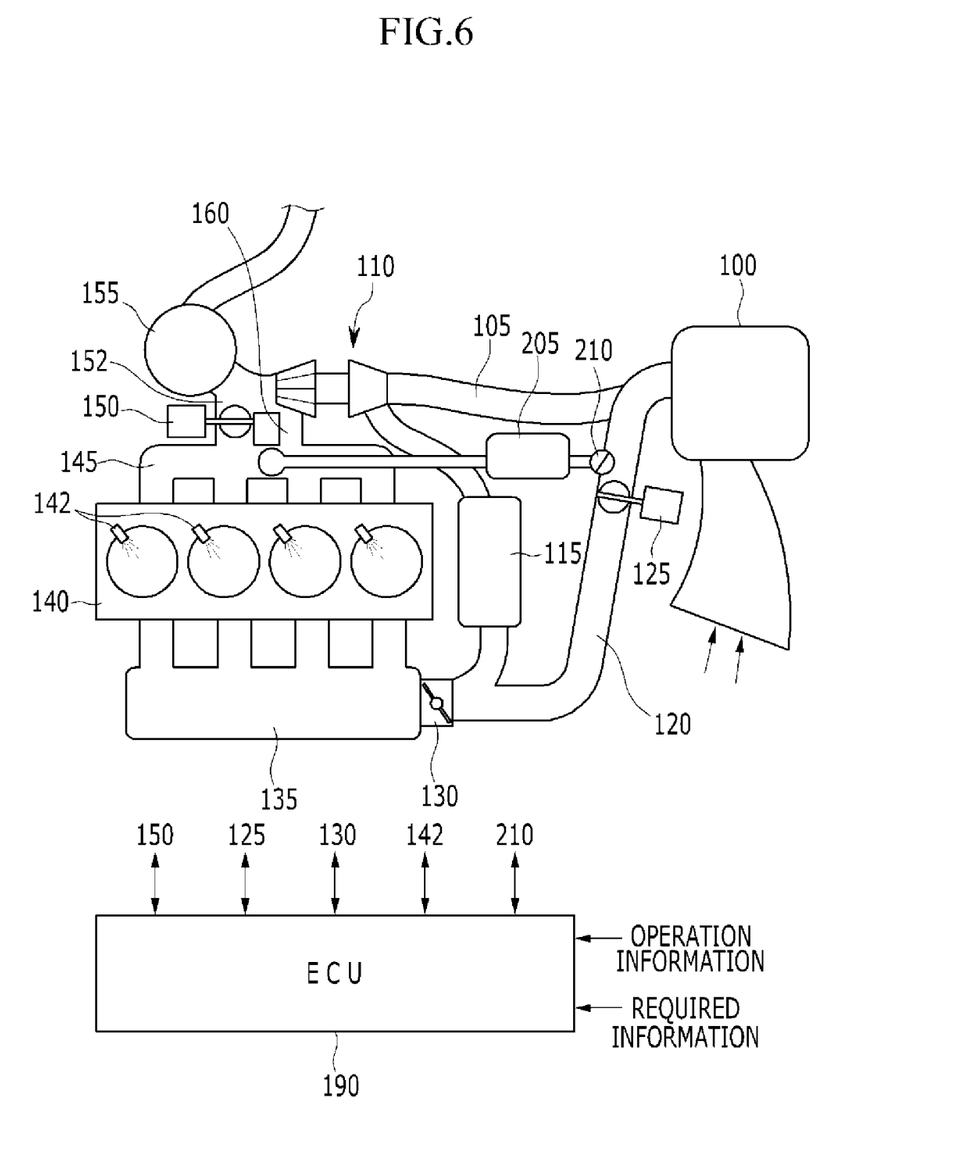
FIG. 6 illustrates a schematic diagram of an engine system in accordance with another exemplary embodiment of the present invention.

FIG. 6 illustrates a schematic diagram of an engine system in accordance with another exemplary embodiment of the present invention, wherein, since the intake bypass valve 125 is disposed to a point adjacent to a point where the supplementary intake line 105 is branched from the main intake line 120, the re-circulated exhaust gas may be controlled, more precisely and more quickly.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention may have been presented for purposes of illustration and description. It is to be understood that the invention is not limited to the disclosed embodiments. On the contrary, it is intended to cover various modifications and equivalent as well as various alternatives and modifications thereof. It is intended that the scope of the invention be defined by the Claims appended hereto and their equivalents.

What is claimed is:

1. An engine system comprising:
   a main intake line configured for supplying external air to an intake manifold attached to a cylinder block;
   a supplementary intake line branched from a first side of the main intake line and joined to a second side of the main intake line;
   an intake bypass valve mounted to the main intake line;
   a main exhaust line mounted to an exhaust manifold attached to the cylinder block for flow of an exhaust gas from the exhaust manifold;
   a supplementary exhaust line being continuously open, directly branched from the exhaust manifold and configured to be separated from the main exhaust line, wherein the supplementary exhaust line includes a first end and a second end and the first end is fluidly-connected to the exhaust manifold and the second end is fluidly-joined to the main exhaust line;
   an exhaust bypass valve mounted to a body of the main exhaust line and selectively opening the main exhaust line;
   a turbocharger disposed adjacent to the supplementary exhaust line and operated by an exhaust gas passing through the supplementary exhaust line for pumping an intake flowing through the supplementary intake line;
   a controller controlling the intake bypass valve and the exhaust bypass valve depending on an operation condition;
   an EGR line directly branched from the exhaust manifold and fluidly-connected to the main intake line between the first side and the second side of the main intake line, wherein the exhaust gas is re-circulated from an upstream side of the exhaust bypass valve to the main intake line, passing through an EGR (Exhaust Gas Recirculation) cooler and an EGR valve.

2. The engine system of claim 1, further comprising an intercooler mounted to the supplementary intake line on a downstream side of the turbocharger and fluid-connected to the main intake line, and
   an EGR line branched from the exhaust manifold at an upstream of the exhaust bypass valve and connected to the main intake line upstream of the intake bypass valve for re-circulating the exhaust gas.

3. The engine system of claim 1, further comprising a throttle valve mounted to an inlet of the intake manifold for controlling an intake flow rate being supplied to the engine.

4. The engine system of claim 2, wherein the controller opens the intake bypass valve and the exhaust bypass valve when a load of the engine system is lower than a set value in a preset speed range in which a speed of the engine system is lower than a present value, and controls opening of the exhaust bypass valve and the EGR valve for controlling re-circulating exhaust gas being supplied to the main intake line through the EGR line.

5. The engine system of claim 2, wherein the controller closes the intake bypass valve and opens the exhaust bypass valve when a load of the engine system is higher than a set value in a preset speed range in which a speed of the engine system is lower than a present value, and controls opening of the exhaust bypass valve and the EGR valve for controlling the re-circulating exhaust gas being supplied to the main intake line through the EGR line.

6. The engine system of claim 2, wherein the intake bypass valve is mounted on a downstream side of, and adjacent to, a point where the EGR line and the main intake line join together.

7. The engine system of claim 2, wherein the intake bypass valve is mounted on an upstream side of a point where the intercooler and the main intake line join together.

8. The engine system of claim 2, wherein the EGR valve is mounted to a point where the EGR line and the main intake line join together.

9. The engine system of claim 2,
   wherein the turbocharger may have an air flow coefficient of below 2 with reference to an air flow rate passing through a compressor, and
   wherein the air flow coefficient is defined as a highest air flow rate (kg/h) passing through the compressor/an exhaust rate (L)/100.

* * * * *